| United States Patent [19] | [11] Patent Number: 4,906,603 |
| Burgfels et al. | [45] Date of Patent: Mar. 6, 1990 |

[54] CATALYST FOR THE STEAM REFORMING OF HYDROCARBONS

[75] Inventors: Götz Burgfels, Bad Feilnbach; Karl Kochloefl, Brückmuhl-Heufeld, both of Fed. Rep. of Germany

[73] Assignee: Sud-Chemie Aktiengesellschaft, Munich, Fed. Rep. of Germany

[21] Appl. No.: 157,033

[22] Filed: Feb. 16, 1988

[30] Foreign Application Priority Data

Feb. 18, 1987 [DE] Fed. Rep. of Germany ....... 3705183

[51] Int. Cl.$^4$ .......................... B01J 23/02; B01J 23/58
[52] U.S. Cl. .................................... 502/328; 502/439; 502/524
[58] Field of Search ............... 502/328, 335, 337, 341, 502/350, 355, 439, 524

[56] References Cited

U.S. PATENT DOCUMENTS

| | | | |
|---|---|---|---|
| 4,410,366 | 10/1983 | Birchau et al. | 106/90 |
| 4,460,704 | 7/1984 | Twigg | 502/325 |
| 4,707,351 | 11/1987 | Lord et al. | 502/439 |
| 4,810,685 | 3/1989 | Twigg et al. | 502/60 |

*Primary Examiner*—Patrick P. Garvin
*Assistant Examiner*—George R. Fourson
*Attorney, Agent, or Firm*—Herbert P. Price

[57] ABSTRACT

A catalyst for the steam reforming of hydrocarbons contains nickel on an alumina/calcium aluminate support which is doped with 0.2 to 10 percent by weight of titanium dioxide. The titanium dioxide has the effect that the calcium aluminate is at least partially in the form of a hibonite [CaO(Al$_2$O$_3$)$_6$] phase in an α-Al$_2$O$_3$ matrix as defined by x-ray diffractometry.

14 Claims, No Drawings

CATALYST FOR THE STEAM REFORMING OF HYDROCARBONS

BACKGROUND OF INVENTION

The invention relates to a catalyst for the steam reforming of hydrocarbons which has improved thermal shock resistance and contains nickel on an alumina/calcium aluminate support.

Steam reforming of hydrocarbons is the hydrogen production process which is at present the most important on an industrial scale. Steam reforming of hydrocarbons is an endothermic reaction, and the heat required for the process must be supplied to the reaction system from the outside. An industrially important variant of this process is autothermic steam reforming, wherein the heat balance of the reaction is maintained by partial oxidation of the hydrocarbons, in particular methane.

Steam reforming poses very stringent requirements on the mechanical properties of the catalysts, especially of the supports. The catalysts must have a high mechanical and thermal stability and thermal shock resistance at temperatures above 800° C., especially above 1000° C., and pressures of around 30 bar in an atmosphere consisting essentially of steam, hydrogen and carbon dioxide. On the other hand, in order to achieve a high activity, the catalysts must have a support matrix having an open pore structure. Hitherto, it has been possible to meet this requirement only at the expense of reducing the mechanical and thermal stability of the catalysts.

Mechanical strength is in general understood as lateral crush strength, which is measured in the known manner on catalysts in the form of pellets or rings.

The ability of a catalyst to withstand, without fracture, sharp temperature changes and the resulting high thermal stresses, that is to say the mechanical stresses caused by thermal treatment, is called thermal shock resistance. If the thermal stresses at any point in the molding exceed critical value (the "crushing strength"), cracks form at this point and can lead, under some circumstances, to complete fracture of the molding.

Attempts have already been made to improve the thermal stability of the supports (mainly based on alumina) of nickel-containing catalysts for the steam reforming of hydrocarbons by the use of certain additives.

Thus, for example, the alumina supports described in European Patent Application 130,835 contain oxides of certain rear earths.

West German Patent No. 2,431,983 describes a nickel catalyst, containing a refractory calcium aluminate, for the steam reforming of hydrocarbons, wherein the support contains 10 to 60 percent by weight of calcium oxide, 0 to 30 percent by weight of beryllium oxide, magnesium oxide and/or strontium oxide, 30 to 90 percent by weight of alumina and less than 0.2 percent by weight of silica. The increase in strength is ascribed mainly to the use of calcium aluminate of low silica content.

Finally, the literature reference Khim. Tekhnol. (USSR) 5, (1979) has disclosed that the mechanical and thermal properties of catalysts for the steam reforming of methane can be improved by adding minor quantities of other oxides to the alumina used as the support. The addition of CaO, $Sc_2O_3$ or $TiO_2$ has here proven to be particularly favorable. This literature reference does not, however, disclose calcium aluminate in supports based on alumina in combination with an addition of small quantities of $TiO_2$.

SUMMARY OF INVENTION

The invention is based on the object of improving the mechanical and thermal stability, in particular the thermal shock resistance, in a catalyst for the steam reforming of hydrocarbons which contains nickel on an alumina/calcium aluminate support, so that such a catalyst does not disintegrate even after a prolonged period in operation under the reaction conditions prevailing in steam reforming.

The catalyst of this invention is made by including in the alumina/calcium aluminate support about 0.2 to about 10 percent by weight, preferably about 0.8 to about 5 percent by weight, of titanium dioxide, wherein said weight percents are based on the total weight of the support.

Preferably, the elemental composition of the support is within the following limits:
Al=about 30 to about 52 percent by weight
Ca=about 1 to about 25 percent by weight
Ti=about 0.1 to about 6 percent by weight
with the balance being oxygen.

DESCRIPTION OF INVENTION

The inclusion of titanium dioxide in the catalyst of this invention evidently effects a transformation of the calcium aluminate, so that the latter is at least partially in the form of a hibonite $[CaO(Al_2O_3)_6]$ phase in an a-$Al_2O_3$ matrix as defined by x-ray diffractometry. The hibonite phase is particularly stable under the reaction conditions of steam reforming, especially those of autothermic steam reforming. Without the addition of the titanium component, or in the case of more than 10 percent by weight of $TiO_2$, other calcium aluminates form phases which are unstable, that is to say have a lower temperature shock resistance. This entails a premature fracture of the support and hence also of the catalyst. Fractured material causes marked increase in the flow resistance in the reactor, so that the latter must be shut down after a relatively short period in operation.

The catalyst according to the invention contains about 2 to about 20 percent by weight, preferably about 7 to about 15 percent by weight, of nickel (relative to the weight of the support). In addition to the nickel, the catalyst according to the invention can also contain minor quantities of cobalt.

The support is preferably a bulk material in the form of spheres, cylinders, rings or other moldings.

The catalyst according to the invention is preferably prepared by mixing hydrated alumina, calcium aluminate and colloidally dispersed titanium compound with water, molding the mixture, precalcining and calcining the moldings to form the support, and coating the resulting support moldings with nickel.

Metatitanic acid ($TiO_2 \cdot X H_2O$) in the form of a collodial aqueous dispersion is used with particular preference. It has been found that the formation of the hibonite phase, which is responsible for the increase in the thermal shock resistance, is essentially a function of the degree of dispersion of the titanium component, since the transformation of the calcium aluminate to the hibonite phase proceeds relatively slowly when titanium dioxide is used in the form of relatively coarse pigment particles. In general, the particle size of the titanium component should not exceed 80,000 nm. Metatitanic acid having the following screen analysis is particularly suitable:

| >40 μm | 40–43 μm | 63–80 μm |
|--------|----------|----------|
| 20%    | 77%      | 3%       |

In general, the support is prepared in such a way that hydrated alumina having a loss on ignition of 33 to 35 percent, aluminate cement and metatitanic acid ($TiO_2 \cdot xH_2O$) having a loss of ignition of 5 to 15 percent are, with the addition of graphite as a pressing aid and about 15 to 20 percent by weight of water, mixed to form a mass which, after kneading is formed into moldings. These support moldings are then dried and preferably subjected to steam hardening. Subsequently, the support moldings are precalcined and calcined.

To determine the physical properties, samples are then taken, which are tested by the conventional methods of bulk density, lateral crush strength, apparent density, thermal shock resistance and impact strength (drop test). In addition, the specific surface area, the pore volume and the pore distribution are determined.

If these data meet the requirements, the support moldings are impregnated with an aqueous nickel salt solution, in particular a nickel nitrate solution, preferably by immersing them into the hot salt solution. The nickel salt is then thermally decomposed (at about 450° C. when nickel nitrate is used). The immersion can be repeated several times, especially if a catalyst having a high nickel content is desired. The nickel salt is thermally decomposed after each immersion. In the thermal decomposition, nickel oxide is formed, which is reduced to nickel under process conditions or by means of a reducing agent.

The invention also relates to the use of the catalyst described above for the steam reforming of hydrocarbons, in particular for autothermic steam reforming of methane. The steam reforming is preferably carried out at temperatures above 800° C. at elevated pressure.

The invention is explained by the examples which follow.

EXAMPLE 1

(Comparison example)

(a) Preparation of the support 150 kg of hydrated alumina and 50 kg of calcium aluminate cement are mixed in the dry state. Water is then added, and mixing is continued. 10 kg of graphite are then added and, after mixing, the resulting mass is dried in air until the loss on drying amounts to 4–10 percent by weight. The mass is then ground and passed through a 4×4 mm screen. This material is then pressed to give rings of 17×17×6 mm. These are then steam-hardened, calcined and finally burned.

The physical/mechanical data of the prepared support are compiled in Tables I and II.

(b) Preparation of the nickel catalyst 140 kg of the prepared support are immersed into 1000 liters of an aqueous nickel nitrate solution (1400 kg of $Ni(NO_3)_2$). After the immersion, the impregnated support is calcined at 450° C. until the nickel nitrate is completely decomposed. This procedure is repeated two or three times, in order to reach a nickel content of about 10 percent by weight in the finished catalyst.

The catalyst is activated for three hours at 750° C. with a mixture of $H_2O$ and $H_2$. The activated catalyst is subjected to a methane steam reforming test.

The reaction conditions were as follows: T=750° C., $H_2O/CH_4$ molar ratio=3, $CH_4$ space velocity=3500 liters (S.T.P.)/hour.

The results of the activity test are given in Table III.

EXAMPLE 2

(a) Preparation of $TiO_2$-containing support (1 percent by weight of $TiO_2$)

150 kg of hydrated alumina, 50 kg of calcium aluminate cement and 1.9 kg of metatitanic acid are mixed in the dry state and then processed further in accordance with Example 1.

The physical/mechanical data of the prepared support are compiled in Tables I and II. The x-ray diffraction diagram showed the values characteristic of the hibonite phase.

| Diffraction angle | Relative intensity | D(Å)   |
|-------------------|--------------------|--------|
| 34.1786           | 100                | 2.6227 |
| 34.2089           | 100                | 2.4794 |
| 67.4094           | 70                 | 1.3906 |

(b) Preparation of the nickel catalyst 142 kg of the prepared support are, as indicated in Example 1, immersed into aqueous nickel nitrate solution and further processed. The resulting nickel catalyst is subjected to a methane steam reforming test as in Example 1.

The results are given in Table III.

EXAMPLE 3

(a) Preparation of $TiO_2$-containing support (5 percent by weight of $TiO_2$)

150 kg of hydrated alumina, 50 kg of calcium aluminate cement and 10 kg of metatitanic acid are mixed in the dry state and then processed further in accordance with Example 1.

The physical/mechanical data of the prepared support are compiled in Tables I and II. The x-ray diffraction lines characteristic of the hibonite phase were somewhat weaker than in the support according to Example 2, since other calcium aluminate phases also formed in addition to the hibonite.

(b) Preparation of the nickel catalyst 145 kg of the prepared support are, as stated in Example 1, immersed into aqueous nickel nitrate solution and further processed. The resulting nickel catalyst is subjected to a methane steam reforming test as in Example 1. The results are given in Table II.

TABLE I

| Physical/chemical data of the support material (rings) | | | |
|---|---|---|---|
| Technical data | Example 1 | Example 2 | Example 3 |
| 1 liter bulk density g/l | 710 | 705 | 771 |
| Average lateral crush strength diameter, kg | 60 | 63 | 60 |
| Thermal shock resistance, quench numbers[1] | 6 | 18 | 8 |
|  | 6 | 53 | 27 |
|  | 7 | 59 | 29 |
|  | 8 | 59 | 44 |
|  | 8 | 67 | 50 |

TABLE I-continued

Physical/chemical data of the support material (rings)

| Technical data | Example 1 | Example 2 | Example 3 |
|---|---|---|---|
| | 15 | 68 | 52 |
| Size, | | | |
| diameter mm | 16.1 | 16.3 | 15.9 |
| height mm | 16.2 | 16.4 | 15.3 |
| internal diameter mm | 5.4 | 5.5 | 5.2 |
| Apparent density[2] g/cm$^3$ | 1,532 | 1,484 | 1,650 |
| Drop Test[3] | | | |
| Whole rings | 80 | 100 | 96 |
| Split rings | 20 | — | 4 |
| TiO$_2$ content, percent by weight | — | 1.03 | 4.8 |

(1) Determination of the resistance to sharp thermal shock by the water-quenching method for refractories according to DIN 51,068, Part 1. The measure of the thermal shock resistance is the number of quenches withstood under the conditions of this standard (quench number). That quench, during which a specimen is destroyed, is to be included in the count.

(2) Apparent density or raw density according to DIN 51,065, Part 1.

(3) Impact strength of 100 rings. A metal ball (28 g) drops into the sample from a height of 35 cm.

TABLE II

Porosity and surface area of the prepared supports

| Description of support | Pore size distribution (%)(a) (nm) | | | | Pore volume (cm$^3$/g) | BET Surface area (m$^2$/g)(b) |
|---|---|---|---|---|---|---|
| | >1750 | 1750-80 | 80-14 | 14-7.5 | | |
| Example 1 | 1.8 | 85.6 | 6.4 | 6.0 | 0.38 | 3 |
| Example 2 | 2.8 | 97.0 | 0.4 | 0.5 | 0.36 | 1 |
| Example 3 | 1.4 | 84.7 | 6.2 | 7.4 | 0.33 | 1 |

(a) Mercury porosimetry
(b) DIN 66,131

TABLE III

Results of the activity test

| Catalyst | Ni content (percent by weight) | CH$_4$ conversion (mol percent) |
|---|---|---|
| Example 1 | 9.6 | 98.4 |
| Example 2 | 9.8 | 98.2 |
| Example 3 | 7.4 | 89.6 |

As can be seen from Table I, the addition of TiO$_2$ leads to a marked increase in the thermal shock resistance of the support. In particular, the narrow pore size distribution of the catalyst of Example 2 is also worth mentioning (97.0 percent of the total pore volume in the range of 1750-80 nm).

What is claimed:

1. A catalyst for the steam reforming of hydrocarbons which consists essentially of nickel on an alumina/calcium aluminate support, wherein the support contains about 0.8 to about 5 percent by weight, based on the weight of the support, of titanium dioxide, wherein the calcium aluminate is at least partially in the form of a hibonite [CaO(Al$_2$O$_3$)$_6$] phase in an $\alpha$-Al$_2$O$_3$ matrix as defined by X-ray diffractometry.

2. The catalyst of claim 1 wherein the elemental composition of the support is:
   Al-about 30 to about 52 percent by weight
   Ca-about 1 to about 25 percent by weight
   Ti-about 0.48 to about 3 percent by weight
   with the balance being oxygen.

3. The catalyst of claim 1 which contains about 2 to about 20 percent by weight of nickel based on the weight of the support.

4. The catalyst of claim 3 wherein the amount of nickel is about 7 to about 15 percent by weight.

5. The catalyst of claim 1 wherein the support is bulk material in the form of spheres, cylinders or rings.

6. A process for producing a catalyst for the steam reforming of hydrocarbons which consists essentially of preparing a support by mixing hydrated alumina, calcium aluminate and a colloidally dispersed titanium compound with water, molding the mixture, precalcining and calcining the molding, and coating the resulting support molding with nickel wherein titanium dioxide is present in the support molding in the amount of about 0.8 to about 5 percent by weight based on the weight of the support, and the calcium aluminate in the support molding is at least partially in the form of a hibonite [CaO(Al$_2$O$_3$)$_6$] phase in an $\alpha$-Al$_2$O$_3$ matrix as defined by X-ray difractometry.

7. The process of claim 6 wherein the elemental composition of the support is:
   Al=about 30 to about 52 percent by weight
   Ca=about 1 to about 25 percent by weight
   Ti=about 0.48 to about 3 percent by weight with the balance being oxygen.

8. The process of claim 6 wherein the catalyst contains nickel in the amount of about 2 to about 20 percent by weight based on the weight of the support.

9. The process of claim 8 wherein the nickel is present in the amount of about 7 to about 15 percent by weight.

10. The process of claim 6 wherein the support is molded into the form of spheres, cylinders or rings.

11. The process of claim 6 wherein the titanium compound is metatitanic acid.

12. The process of claim 6 wherein the support molding is subjected to steam hardening before calcination.

13. The process of claim 6 wherein the support molding is impregnated with an aqueous nickel salt solution and the nickel salt is thermally decomposed to nickel oxide.

14. The process of claim 13 wherein the nickel salt is nickel nitrate.

* * * * *